United States Patent [19]

Pauwels

[11] Patent Number: 4,957,631
[45] Date of Patent: Sep. 18, 1990

[54] TRAVELING BRIDGE FILTER WITH SURFACE WASH

[75] Inventor: Julian R. Pauwels, Thomasville, Ga.

[73] Assignee: Davis Water and Waste Industries, Inc., Thomasville, Ga.

[21] Appl. No.: 301,715

[22] Filed: Jan. 26, 1989

[51] Int. Cl.⁵ .............................................. B01D 24/22
[52] U.S. Cl. .................................. 210/264; 210/276; 210/292
[58] Field of Search ............... 210/265, 271, 273, 275, 210/277, 281, 284, 289, 291, 292, 293, 264, 276

[56] References Cited

U.S. PATENT DOCUMENTS

| | | | |
|---|---|---|---|
| Re. 12,488 | 5/1906 | Blaisdell | 210/273 |
| 471,811 | 3/1892 | Deutsch | 210/271 |
| 649,409 | 5/1900 | Jewell | 210/271 |
| 1,383,384 | 7/1921 | Brown | 210/275 |
| 1,617,654 | 2/1927 | Sivade | 210/275 |
| 2,194,071 | 3/1940 | Hine | 210/128 |
| 2,235,227 | 3/1941 | Lose, Jr. | 210/128 |
| 2,302,449 | 11/1942 | Laughlin | 210/271 |
| 2,302,450 | 11/1942 | Laughlin | 210/130 |
| 2,335,749 | 11/1943 | Fraser | 210/128 |
| 3,984,326 | 10/1976 | Bendel | 210/264 |
| 4,133,766 | 1/1979 | Adie | 210/275 |
| 4,152,265 | 5/1979 | Meyers | 210/273 |
| 4,211,656 | 7/1980 | Cochrane | 210/149 |
| 4,308,141 | 12/1981 | Clendenen | 210/264 |
| 4,382,863 | 5/1983 | Riise | 210/271 |
| 4,450,077 | 5/1984 | Black et al. | 210/275 |
| 4,454,034 | 6/1984 | Astrom et al. | 210/108 |
| 4,486,307 | 12/1984 | Weiler | 210/275 |
| 4,540,487 | 9/1985 | Johnson et al. | 210/264 |
| 4,624,783 | 11/1986 | Black et al. | 210/271 |

Primary Examiner—Richard V. Fisher
Assistant Examiner—Wanda L. Millard
Attorney, Agent, or Firm—Nixon & Vanderhye

[57] ABSTRACT

A liquid filtration system is provided which includes a traveling bridge device mounting and backwash means for successively cleaning each of a plurality of filter cells formed in a filtration tank. Both surface wash and backwash means are included in a single hood structure adapted to sealingly engage each filter cell, successively, as the traveling bridge carriage traverses the tank. The surface wash means includes a surface wash conduit for supplying liquid under pressure to the upper surface layer of each cell. The backwash means includes a backwash conduit for creating suction within each filter cell.

18 Claims, 2 Drawing Sheets

TRAVELING BRIDGE FILTER WITH SURFACE WASH

BACKGROUND AND SUMMARY OF THE INVENTION

This invention relates generally to liquid filtration systems and, more specifically, to traveling bridge-type cleaning devices for sequentially cleaning a plurality of downward flow, suspended solids filter units located within a relatively large filtration tank.

It is well known in the art to utilize filtration tanks divided into a plurality of filter cells, one adjacent the other, and all containing a multi-layer arrangement of granular filter media such as sand, gravel and the like. In downward flow filtration systems of this type, water or other liquid containing suspended solid particles is introduced into the filtration tank from above and clarified water is drawn off from a chamber beneath the filter cells. During downward flow through the individual cells, particulate matter is entrapped within the layers of granular filter media. Eventually, the particulate matter clogs the filter media, thereby reducing the filtering capability of the system. Thus, there is a need for periodic cleaning of the filter cells. It is also known to maintain such units in continuous operation during cleaning by the use of traveling bridge devices which move from one filter cell to the next, to backwash individual cells while permitting the filtration process to continue in the remaining cells.

Examples of traveling bridge apparatus of this type may be seen in U.S. Pat. Nos. 4,540,487; 4,486,307; 4,133,766; 3,984,326; 2,235,227, and 649,409. Typically, traveling bridge systems include an overhead carriage, movable along tracks, guideways or the like, which carries, e.g., a backwash hood successively engageable with the upper end of each filter cell. For a downflow type filter, water or other treatment liquid is generally introduced into the cell from below, in a counterflow arrangement to the normal filtering direction. The backwash hood typically includes a suction head for drawing out fluid and debris forced to the surface of the filter cell as a result of the backwash. As the backwash of an individual cell is completed, the traveling bridge will index the backwash hood to the next adjacent cell. See, for example, U.S. Pat. No. 4,308,141, in which a modular filter system is disclosed, and wherein a traveling bridge type backwash system is indexed to successive filter units.

There are also known in the prior art devices for breaking up a mat or layer of material which forms on the surface of a filter bed. For example, in U.S. Pat. No. 2,335,749, a pair of surface raking mechanisms are utilized on either side of a backwash caisson. In U.S. Pat. No. 2,194,071, a overhead surface wash system is disclosed wherein a spray head having fixed jets is suspended from a carriage, enabling wash liquid to be directed downwardly onto the upper surface of the filter bed as the carriage moves along the length of the tank. A conventional, stationary backwash system is utilized to wash the loosened material upwardly into one or more stationary discharge troughs.

U.S. Pat. Nos. 4,152,265 and 4,454,034 disclose traveling bridge filtration systems which combine backwash operations with the utilization of mechanical scarifying blades which are said to break up and loosen the mat on the surface of the bed.

In the present invention, a unique combination of filter cell cleaning devices is provided in a traveling bridge configuration. In one exemplary embodiment, an elongated, rectangular filtration tank is divided into a plurality of individual cells by a plurality of laterally spaced, substantially parallel partitions extending across the width of the tank. The tank is further provided with tracks or guideways supporting a traveling bridge for movement along the top of the tank, in a direction transverse to the orientation of the upright partitions. In an exemplary embodiment of the invention, the traveling bridge comprises a carriage from which is suspended surface wash means as well as backwash means, located within a single hood assembly, arranged for sequential sealing engagement with each filter cell.

The single surface wash/backwash hood assembly of this exemplary embodiment of the invention extends across substantially the full width of the tank, i.e., along substantially the entire length of the individual filter cells. The hood per se includes a pair of lower side wall portions which are spaced apart a distance corresponding to the distance between the individual cell partitions, as well as upper side wall portions which are inclined toward each other and which intersect at a hood apex.

Located within the hood, and extending substantially parallel to, and midway between, the lateral lower side wall portions of the hood, is a surface wash manifold, extending substantially across the width of the tank, and provided at spaced positions along its length with a plurality of discharge nozzles from which liquid is dispensed under pressure onto the upper surface of the filter bed. The surface wash manifold is connected to a substantially vertically oriented surface wash conduit which extends upwardly through the hood to a first fluid surface wash pump mounted on the traveling bridge carriage.

In the exemplary embodiment, water is supplied to the pump from a clean water trough adjacent the tank, although it will be appreciated that water may also be supplied from any fresh or clean water source.

A horizontal backwash manifold is also located within the hood, above the surface wash manifold, and generally coextensive therewith. The backwash manifold is preferably located in the area of the inclined upper wall portions of the hood. The backwash manifold is connected substantially midway along its length to a vertical suction conduit which also extends upwardly, through the hood, to a second fluid backwash pump mounted on the travelling bridge carriage. This second pump is a suction pump, the inlet side of which is connected to the vertical suction conduit.

The horizontal backwash manifold is provided with a plurality of uniformly arranged apertures extending along its length and about its periphery to uniformly draw liquid and accompanying debris upwardly out of a filter cell in a direction opposite the normal filter flow direction to thoroughly backwash the filter media.

In order to index the hood assembly to successive cells along the length of the filtration tank, the hood assembly is reciprocable vertically a distance sufficient to enable the hood assembly to disengage from the cell partitions or walls, and to clear the adjacent cell partitions during lateral movement to the next cell. To this end, portions of the vertical surface wash conduit and vertical backwash conduit, respectively, may be provided with flexible, e.g., bellows-type, connectors which permit a relatively small degree of vertical movement of the hood structure vis-a-vis the vertically fixed carriage.

Accordingly, in its broadest aspect, the present invention relates to a traveling bridge filter cleaning system including a liquid filtration tank divided into a plurality of adjacent filter cells, each of the cells containing filter media; a traveling bridge carriage located above the tank and movable along the tank, the carriage mounting surface wash means and backwash means within a single hood assembly adapted to sealingly engage successive ones of the filter cells.

For each individual cell, the carriage mounted first and second pumps may be simultaneously activated so that the mat or crust of material present on the upper surface of the filter bed is broken up by the surface wash, while at the same time, the backwash expands and cleans the filter media from below, drawing dirt and debris as well as the broken surface crust or mat material upwardly into the suction conduit located in the hood assembly. In this way, the filter media is effectively cleaned, the formation of mudballs is prevented, and the full filtration capability of the cell is restored.

It will therefore be appreciated that the present invention provides a unique combination of surface wash and backwash means in a single hood assembly within a traveling bridge filter cleaning system, which effectively cleans successive cells of a multi-cell tank without disturbing the filtering process in the remaining cells.

Additional objects and advantages of the subject invention will become apparent from the detailed description which follows.

DETAILED DESCRIPTION OF THE DRAWINGS

Figure 1:
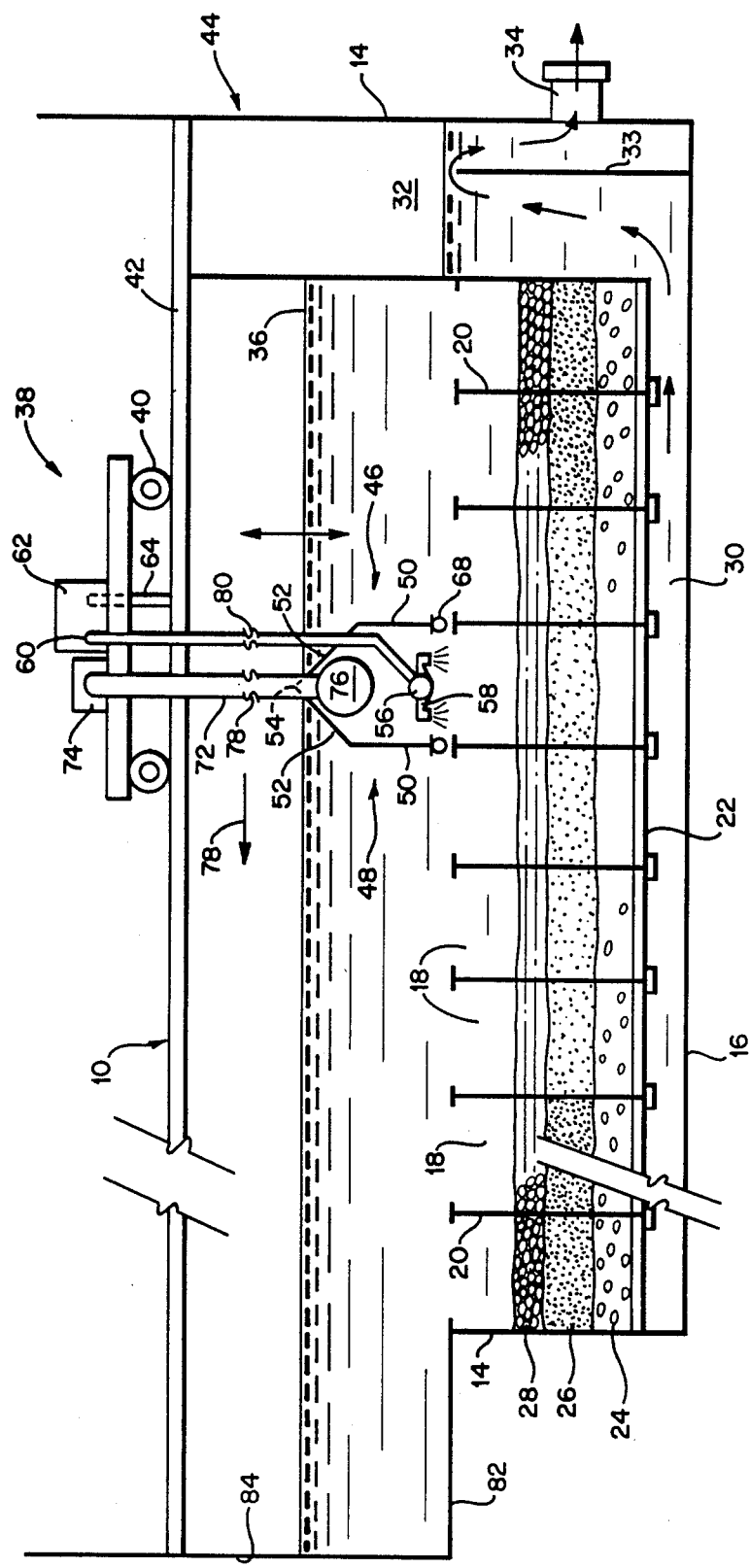
FIG. 1 is a schematic side view of a traveling bridge type filtration system in accordance with the invention.
Figure 2:
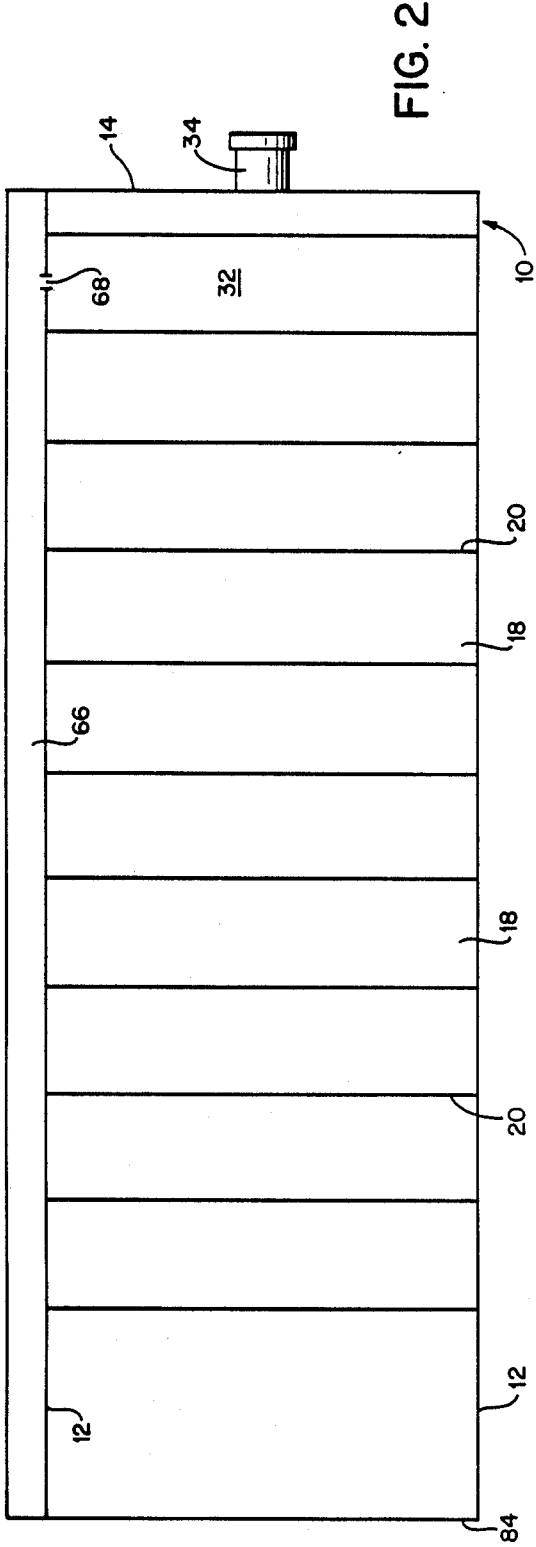
FIG. 2 is a schematic plan view of the filtration tank shown in FIG. 1 with the traveling bridge components removed for clarity.
Figure 3:
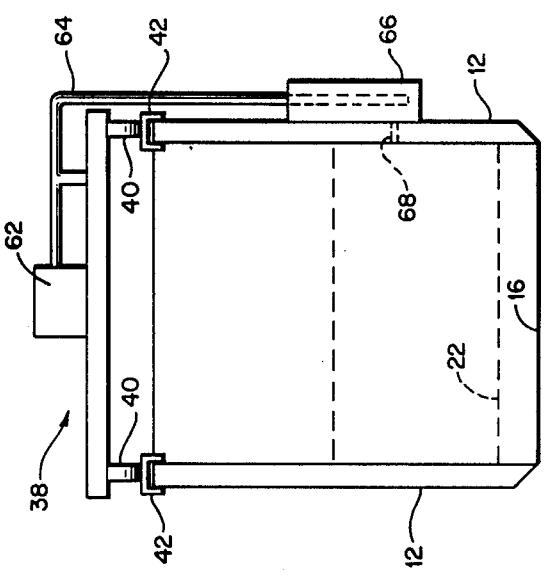
FIG. 3 is a schematic end view of a traveling bridge filtration system shown in FIG. 1.

Referring now to FIGS. 1-3, a suspended solids filtration apparatus in accordance with this invention includes a substantially rectangular tank 10 comprising side walls 12, end walls 14 and a bottom wall 16. The tank is divided into a plurality of filter cells 18 by generally upright, spaced partitions 20 which extend from one side of the tank to the other, in a substantially parallel arrangement, and substantially transversely of the direction of elongation of the tank. It will be appreciated, however, that the shape of the tank and the orientation of the filter cell partitions may be varied in accordance with design requirements, etc.

The tank includes an underdrain or subfloor 22 resting on the partitions 20, and which supports a multi-layer filter media bed comprising, preferably, layers of gravel 24, sand 26 and anthracite 28 (or other suitable filter media). The space between bottom wall 16 and subfloor 22 comprises a chamber 30 which forms a clearwell. The filtered water flows past a weir area 32 including a vertical baffle 33 and out of the tank via an outlet 34. Under normal circumstances, the water or other fluid to be treated is supplied to the tank at a level above the filter media by any suitable means (not shown) and the tank is filled to a level 36.

In accordance with one exemplary embodiment of this invention, surface wash and backwash means are movably supported on a carriage 38 provided with a plurality of wheels 40 which are guided along tracks or guideways 42 on an upper extension 44 of the tank. It will be appreciated that the tracks or guideways may also be part of an overhead framework or the like, separate from the tank design. Further, in this regard, it is to be noted that the carriage and controls for indexing the carriage are not part of this invention, and may be of any conventional construction.

The carriage 38 supports a combined surface wash and backwash device 46 in suspended relationship vis-a-vis the carriage.

The combined surface wash/backwash device 46 of this invention includes a single hood structure 48 which extends across the tank, along substantially the entire length of the filter cells 18. The hood 48 includes a pair of lower side wall portions 50 which are spaced apart a distance corresponding substantially to the distance between the filter cell partitions 20. Tapered wall portions 52 extend inwardly and upwardly from the parallel side wall portion to an apex 54, although it will be understood that other hood configurations may be utilized.

Located within the hood 48, and extending substantially parallel to the side wall portions 50 is a surface wash manifold 56 provided with a plurality of nozzles 58 extending from either side of the manifold, and in spaced relationship along the length thereof. A surface wash fluid supply conduit 60 extends substantially vertically upwardly from the manifold and out of the hood 48 to a pump 62 mounted on the carriage 38. It will be understood that conduit 60 is connected to the outlet side of the pump, while a conduit 64 is connected to the inlet side of the pump. Conduit 64 supplies liquid to the pump and, in one exemplary embodiment, the supplied liquid originates in a trough 66 mounted to one side of the filtration tank. The trough 66 receives filtered water from the weir area 32, and to this end, a pipe 68 extends between the trough and the weir area thereby providing a ready supply of liquid for the surface wash pump.

Alternatively, fresh clean water from any suitable source may be supplied to the surface wash device.

The laterally spaced, substantially parallel side walls 50 are provided along their lowermost surfaces with sealing means such as rubber gaskets 68 which are secured thereto by any suitable means, enabling air and water tight seals to be established between the hood 48 and individual filter cells 18.

The backwash device includes a backwash suction conduit 72 which extends downwardly from a suction pump 74 mounted on the carriage 38. The suction conduit 72 extends through the hood 48, approximately midway along the length of the hood, and is connected to a horizontal backwash manifold 76 which extends generally parallel to the cell partitions 20 and substantially across the entire width of the tank, within an upper portion of the hood, between the inclined portions 52 of the hood sidewalls. The manifold 76 is also provided with a plurality of perforations (not shown) which provide for substantially uniform suction within the hood 48 across the respective cell 18.

It will be appreciated that in a cell cleaning operation, carriage 38 will successively index the surface wash and backwash means within the hood 48 to the individual filter cells 18, in the direction of the arrow 78 in FIG. 1. At the same time, it will be appreciated that means must be provided to move the hood 48 vertically toward the cells 18. The movement is required to enable sealing engagement between the hood 48 and an individual cell 18. After cleaning, the surface wash/backwash hood is retracted vertically upwardly away from the cells a relatively small distance, e.g., on the order of two inches, to provide clearance which permits horizontal indexing of the hood assembly to the next cell. The vertical reciprocatory movement may be effected by any conventional means (not shown), such as hydraulic cylinders, jacks, etc., along with conventional controls.

In order to permit relative movement between the hood 48 and carriage 38, flexible couplings 78, 80 are interposed in conduits 72, 60, respectively. The couplings may be in the nature of a bellows or any other suitable flexing means.

It is a further feature of the invention that the tank include, at one end thereof, horizontal and vertical wall portions 82, 84 to create an extended tank portion which accommodates the traveling bridge carriage when not in use, enabling unrestricted access from above to all of the filter cells.

In operation, after the carriage has been moved to one end of the tank, i.e., to the far right in FIG. 1, the surface wash/backwash hood is lowered into position, beneath water level 36, such that the seals or gaskets 68 engage the upper ends of the partitions 20 of the first filter cell 18. After surface wash and backwash are completed as to the first cell, the hood assembly is retracted upwardly and moved laterally via carriage 38 to the next filter cell 18 and thereafter lowered into position so that the hood 48 engages the second filter cell, etc. This procedure may be repeated until the last cell is reached at the far left side of the tank (FIG. 1).

It will be appreciated that as the hood assembly is lowered into position over a subjacent filter cell, gaskets 68 on the hood walls establish a hydraulic seal which isolates the filter cell 18 from the remaining cells in the tank, and which prevents debris in the one cell from moving into one or both adjacent cells.

During surface wash, pump 62 supplies water under pressure to the horizontal surface wash manifold 56 via conduit 60. The water is discharged through the plurality of nozzles 58 and breaks up any crust or mat-like material which has formed on the surface of the filter bed. Suitable screening material may be used if desired to cover the perforations in the manifold 56 to prevent clogging of the perforations with dislodged debris, filter media, etc.

Backwash is carried out simultaneously with the above described surface wash. During backwash, suction is created in the horizontal suction manifold 76 via pump 74, drawing water upwardly, countercurrent to the normal flow, through the underdrain or sub floor 22, filter media layers 24, 26, 28, hood 48, manifold 76 and backwash suction conduit 72, all the while cleansing the filter media and removing particulate matter, including that dislodged in the surface wash operation. From pump 74, the backwash liquid is discharged through a hose to a trough or drain (not shown) in a conventional manner.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a traveling bridge filter cleaning system including a liquid filtration tank divided into a plurality of adjacent filter cells, each of said cells containing filter media, a traveling bridge carriage located above said tank and movable along said tank, said carriage mounting a surface wash manifold and a backwash manifold within a suspended hood assembly adapted to sealingly engage each of said cells, said surface wash manifold including a plurality of nozzles extending therefrom, said surface wash manifold and said plurality of nozzles being substantially fixed relative to said hood assembly.

2. A traveling bridge as defined in claim 1 wherein said hood assembly comprises a pair of side walls, having upper and lower portions, the lower portions of said sidewalls provided with sealing means for sealingly engaging partitions in said tank which define said filter cells.

3. A traveling bridge filter system as defined in claim 1 wherein each of said cells is provided with at least three layers of filter media supported by a porous underdrain.

4. A travelling bridge as defined in claim 1 wherein said backwash manifold extends substantially horizontally along substantially the entire length of said hood assembly.

5. A traveling bridge as defined in claim 4 wherein said surface wash manifold is located beneath said backwash manifold, and is substantially coextensive therewith.

6. A traveling bridge as defined in claim 5 wherein said carriage mounts a surface wash pump for supplying liquid under pressure to an upper surface of each of said filter cells, successively, through said surface wash manifold, and a backwash pump for creating suction within each of said filter cells, successively, through said backwash manifold.

7. A filtration system for suspended solids within a liquid comprising a tank divided into a plurality of individual filter cells, each cell defined by a pair of laterally spaced partitions extending across the tank, said tank including a subfloor supported by said partitions above a bottom wall of said tank; said subfloor also supporting a multi-layer filter media bed in each of said filter cells; a traveling bridge including a carriage movable along said tank and indexable to each of said filter cells; and wherein said carriage supports a hood assembly including surface wash means and backwash means for successive engagement with each of said filter cells, said surface wash means including means for supplying pressurized water for breaking up surface crust material formed on the liquid.

8. A filtration system as defined in claim 7 wherein said filter cells are of the downward flow-type and wherein clarified liquid flows through a chamber located between said bottom wall and said subfloor and into a weir area.

9. A filtration system as defined in claim 7 wherein said tank is provided with means for guiding said carriage along said tank, and wherein said tank is provided with extended wall areas permitting said carriage to be moved beyond said filter cells, thereby permitting unrestricted access to said filter cells.

10. A combined surface wash and backwash device for a traveling bridge filter system wherein the device is carried by a carriage movable across a plurality of adjacent filter cells, the device comprising:

a hood assembly adapted to successively engage in sealing relationship with each of the filter cells, said hood carrying a surface wash manifold including a plurality of nozzles fixedly secured within said hood assembly for discharging fluid onto filter media within the filter cells in a first direction, and a backwash manifold for withdrawing fluid from the filter cell in a second direction opposite to the first direction.

11. A device as defined in claim 10 wherein said surface wash manifold extends substantially the entire length of the filter cell.

12. A device as defined in claim 11 wherein said backwash manifold also extends substantially the entire length of the filter cell.

13. A device as defined in claim 10 and further including surface wash pump means and backwash pump means for simultaneously supplying fluid to and withdrawing fluid from, each of said filter cells, successively.

14. A device as defined in claim 10 wherein said backwash manifold is perforated along its length so that fluid may be uniformly withdrawn from the filter cell.

15. A device as defined in claim 10 wherein said surface wash manifold is operatively connected to a surface wash pump mounted on said carriage.

16. A device as defined in claim 15 wherein said surface wash pump draws filtered fluid from said a trough mounted to one side of the tank.

17. A filtration system for suspended solids within a liquid comprising a tank divided into a plurality of individual downward flow-type filter cells, each cell defined by a pair of laterally spaced partitions extending across the tank, said tank including a subfloor supported by said partitions above a bottom wall of said tank; said subfloor also supporting a multi-layer filter media bed in each of said filter cells; a traveling bridge including a carriage movable along said tank and indexable to each of said filter cells; wherein said carriage supports a hood assembly including surface wash means and backwash means for successive engagement with each of said filter cells, said surface wash means including means for supplying pressurized water for breaking up surface crust material formed on the liquid; and wherein clarified liquid flows through a chamber located between said bottom wall and said subfloor and into a weir area.

18. A filtration system as defined in claim 17 wherein said tank is provided with means for guiding said carriage along said tank, and wherein said tank is provided with extended wall areas permitting said carriage to be moved beyond said filter cells, thereby permitting unrestricted access to said filter cells.

* * * * *